US011194012B2

(12) United States Patent
Im et al.

(10) Patent No.: US 11,194,012 B2
(45) Date of Patent: Dec. 7, 2021

(54) RADIO SOURCE POSITION ESTIMATION SYSTEM

(71) Applicant: Korea Aerospace Research Institute, Daejeon (KR)

(72) Inventors: Sung Hyuck Im, Daejeon (KR); Moon Beom Heo, Daejeon (KR); Se Bum Chun, Daejeon (KR); Deok Won Lim, Daejeon (KR); Eun Seong Son, Daejeon (KR); Koon Tack Kim, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 218 days.

(21) Appl. No.: 16/065,825

(22) PCT Filed: Dec. 21, 2016

(86) PCT No.: PCT/KR2016/015053
§ 371 (c)(1),
(2) Date: Jun. 25, 2018

(87) PCT Pub. No.: WO2017/111477
PCT Pub. Date: Jun. 29, 2017

(65) Prior Publication Data
US 2019/0011525 A1    Jan. 10, 2019

(30) Foreign Application Priority Data
Dec. 24, 2015    (KR) ........................ 10-2015-0186217

(51) Int. Cl.
*G01S 3/02*    (2006.01)
*G01S 5/06*    (2006.01)
(Continued)

(52) U.S. Cl.
CPC .............. *G01S 5/06* (2013.01); *G01S 5/0221* (2013.01); *G01S 5/0036* (2013.01);
(Continued)

(58) Field of Classification Search
CPC ........ G01S 5/06; G01S 5/0036; G01S 5/0081; G01S 5/221; G01S 5/04; G01S 5/0226; G01S 19/01; G01S 19/14
(Continued)

(56) References Cited

U.S. PATENT DOCUMENTS 4,740,792 A * 4/1988 Sagey .................. G01S 5/0009
                                                342/457
5,099,245 A * 3/1992 Sagey ...................... G01S 5/06
                                                342/357.2

(Continued)

FOREIGN PATENT DOCUMENTS

JP          3739078       1/2006
JP       2008-241636      10/2008
(Continued)

*Primary Examiner* — Chuong P Nguyen

(57) ABSTRACT

Provided is a radio source position estimation system including a plurality of radio transmission devices spaced a predetermined distance apart from one another and configured to transmit radio frequency (RF) signals received from an arbitrary radio source and a central radio reception device configured to estimate a position of the radio source using the RF signals received from at least three radio transmission devices.

9 Claims, 3 Drawing Sheets

(51) Int. Cl.
*G01S 5/02* (2010.01)
*G01S 19/01* (2010.01)
*G01S 5/04* (2006.01)
*G01S 5/00* (2006.01)

(52) U.S. Cl.
CPC ............... *G01S 5/0081* (2013.01); *G01S 5/04* (2013.01); *G01S 19/01* (2013.01)

(58) Field of Classification Search
USPC .................. 342/451, 464, 357.52, 357.39
See application file for complete search history.

(56) References Cited

U.S. PATENT DOCUMENTS

| | | | | |
|---|---|---|---|---|
| 6,028,551 A * | 2/2000 | Schoen | ................ | G01S 1/0428 342/357.37 |
| 6,243,587 B1 * | 6/2001 | Dent | .................. | G01S 5/06 342/457 |
| 6,784,827 B2 * | 8/2004 | Hirt | ..................... | G01S 5/02 342/42 |
| 7,050,817 B2 * | 5/2006 | Olaker | ................ | G01S 5/06 342/387 |
| 7,190,271 B2 * | 3/2007 | Boyd | .................... | G01S 5/021 340/539.13 |
| 7,218,229 B2 * | 5/2007 | Boyd | .................... | G01S 5/021 340/539.1 |
| 7,499,711 B2 * | 3/2009 | Hoctor | ................ | G01S 5/06 455/404.2 |
| 7,750,841 B2 * | 7/2010 | Oswald | ................ | G01S 13/878 342/147 |
| 7,756,218 B2 * | 7/2010 | Nakahara | ............ | H04L 1/1887 375/299 |
| 8,208,939 B2 * | 6/2012 | Aljadeff | ................ | G01S 5/0257 455/456.1 |
| 8,576,829 B2 * | 11/2013 | Aljadeff | ................. | G01S 5/021 370/350 |
| 8,749,431 B2 * | 6/2014 | Thill | ...................... | G01S 5/0081 342/357.2 |
| 10,656,240 B2 * | 5/2020 | Furman | ................ | G01S 5/06 |
| 2003/0069025 A1 * | 4/2003 | Hoctor | ................. | H04B 1/7163 342/28 |
| 2003/0174086 A1 * | 9/2003 | Hirt | ........................ | G01S 5/02 342/42 |
| 2008/0186231 A1 * | 8/2008 | Aljadeff | ................. | G01S 5/06 342/387 |
| 2011/0050501 A1 * | 3/2011 | Aljadeff | ................. | G01S 5/0221 342/387 |
| 2011/0221631 A1 * | 9/2011 | Thill | .................... | G01S 5/0221 342/357.2 |
| 2012/0293373 A1 * | 11/2012 | You | ......................... | G01S 5/06 342/465 |
| 2013/0285855 A1 * | 10/2013 | Dupray | ................. | G01S 5/0278 342/451 |
| 2014/0225780 A1 * | 8/2014 | Liu | ........................... | G01S 5/06 342/465 |
| 2018/0132201 A1 * | 5/2018 | Guillot | ................ | H04W 56/006 |

FOREIGN PATENT DOCUMENTS

| | | |
|---|---|---|
| KR | 10-2006-0132191 | 12/2006 |
| KR | 10-2013-0134841 | 12/2013 |
| KR | 10-1446445 | 10/2014 |
| WO | WO 2017/111477 | 6/2017 |

\* cited by examiner

RADIO SOURCE POSITION ESTIMATION SYSTEM

RELATED APPLICATIONS

This application is a National Phase of PCT Patent Application No. PCT/KR2016/015053 having International filing date of Dec. 21, 2016, which claims the benefit of priority of Korean Patent Application No. 10-2015-0186217 filed on Dec. 24, 2015. The contents of the above applications are all incorporated by reference as if fully set forth herein in their entirety.

FIELD AND BACKGROUND OF THE INVENTION

The present invention relates to a radio source position estimation system.

Because global positioning system (GPS) signals received on the ground have low power of about −160 dBW, they are easily affected by disturbance signals. Thus, research into ways of reducing the effects of GPS disturbance signals and research into ways of estimating the position of a disturbance source and a countermeasure therefor have been briskly carried out.

Methods, whereby signals received from remote radio reception devices spaced a sufficient distance apart from one another are digitally sampled and are transmitted to a central radio reception device via a high-speed communication line and then a time difference between two or more received signals is used, have been used to estimate the position of a radio transmission source.

In order to use these methods, time synchronization between the remote radio reception devices and the central radio reception device is required to be performed. The high-speed communication line is connected to the remote radio reception devices and the central radio reception device so that movement between the remote radio reception devices and the central radio reception device is not possible.

In particular, a high-priced GPS and an atomic clock are required to be mounted on the remote radio reception devices so that time synchronization between the remote radio reception devices and the central radio reception device can be performed. Equipment for a high-performance digital sampling device and a high-speed communication device is required to be mounted on the remote radio reception devices.

Additional equipment mounted on the remote radio reception devices causes an error of the result of position estimation due to an error of the time difference, and only static position estimation is possible due to the impossibility of movement between the devices.

SUMMARY OF THE INVENTION

The present invention is directed to providing a radio source position estimation system that is capable of improving accuracy without the need for mounting additional time synchronization equipment or digitalization equipment on remote radio reception devices.

The present invention is also directed to providing a radio source position estimation system that is capable of estimating the position of a radio source in a rapid and wide manner by ensuring mobility of radio tracking equipment.

One aspect of the present invention provides a radio source position estimation system including a plurality of radio transmission devices spaced a predetermined distance apart from one another and configured to transmit radio frequency (RF) signals received from an arbitrary radio source and a central radio reception device configured to estimate a position of the radio source using the RF signals received from at least three radio transmission devices.

The central radio reception device may include: a plurality of reception antenna units provided to correspond to the radio transmission device in a one-to-one manner and configured to receive RF signals transmitted from the radio transmission device; a reference time provision unit configured to provide a time reference; a plurality of analog-to-digital (A/D) signal converters configured to perform digital sampling on the RF signals received independently by the plurality of reception antenna units; and a position estimation unit configured to estimate a position of the radio source by applying a time difference of arrival (TDOA) to the digitally-sampled RF signals.

Each of the A/D signal converters may perform digital sampling by referring to a reference time provided by the reference time provision unit.

The radio transmission device may include: a radio reception antenna unit configured to receive RF signals from the arbitrary radio source; a signal amplification unit configured to amplify the RF signals; and a radio transmission antenna unit configured to transmit the amplified RF signals to the central radio reception device.

At least one of the radio reception antenna unit and the radio transmission antenna unit may be a directional antenna.

The radio transmission device may be mounted on a moving body.

In a radio source position estimation system according to the present invention, accuracy can be improved without the need for mounting additional time synchronization equipment or digitalization equipment on remote radio reception devices.

In addition, mobility of radio tracking equipment is attained so that the position of a radio resource can be estimated rapidly and widely.

DESCRIPTION OF SPECIFIC EMBODIMENTS OF THE INVENTION

Figure 1:
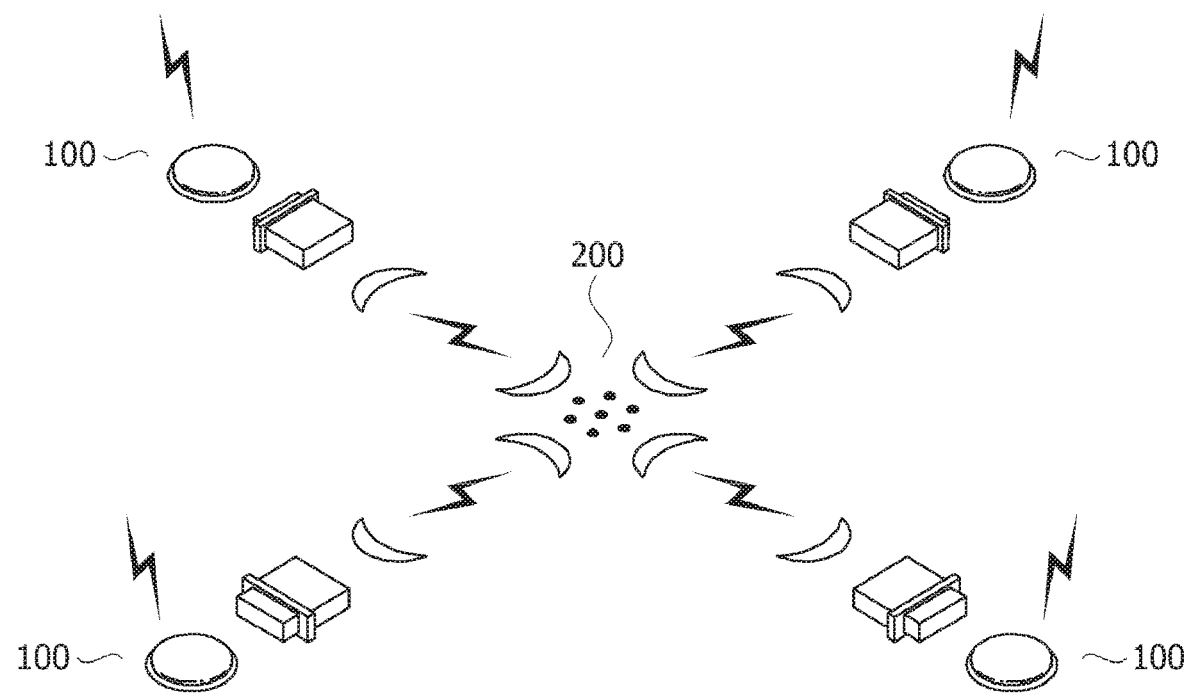
FIG. 1 is a conceptual view of a radio source position estimation system according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used here, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The terminology used herein is for the purpose of describing particular embodiments only and is not intended to be limiting to the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Example embodiments of the invention will be described below in more detail with reference to the accompanying drawings. Those components that are the same or are corresponding are rendered the same reference numeral regardless of the figure number, and redundant explanations are omitted.

Figure 2:
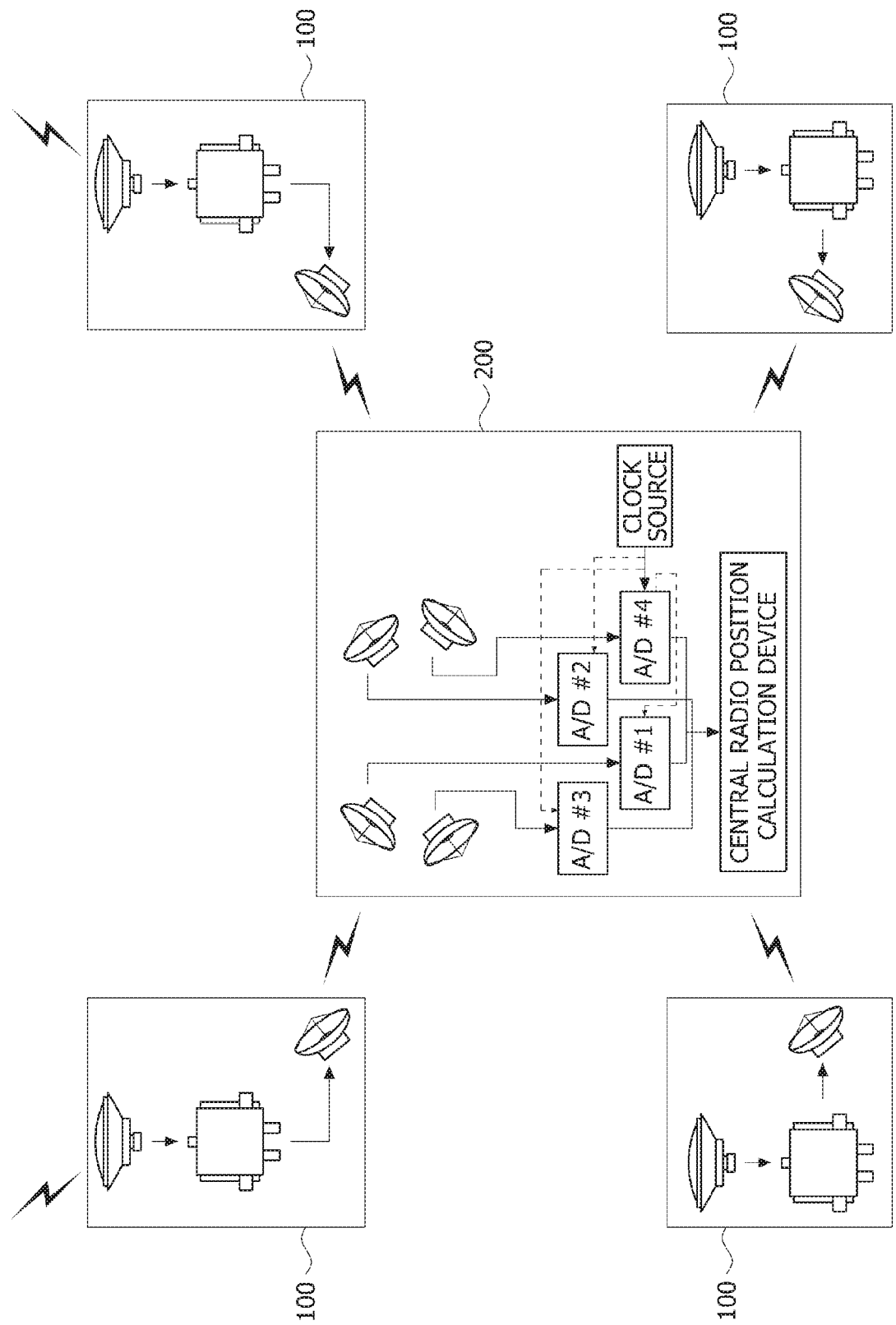
FIG. 2 is a view of a configuration of a radio source position estimation system according to an embodiment of the present invention.
Figure 3:
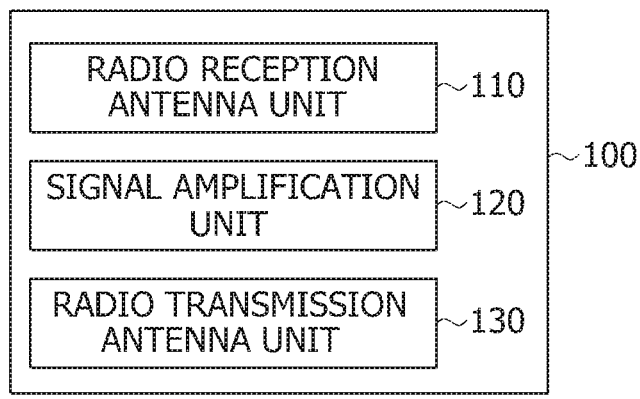
FIG. 3 is a block diagram of a configuration of a radio transmission device according to an embodiment of the present invention.
Figure 4:
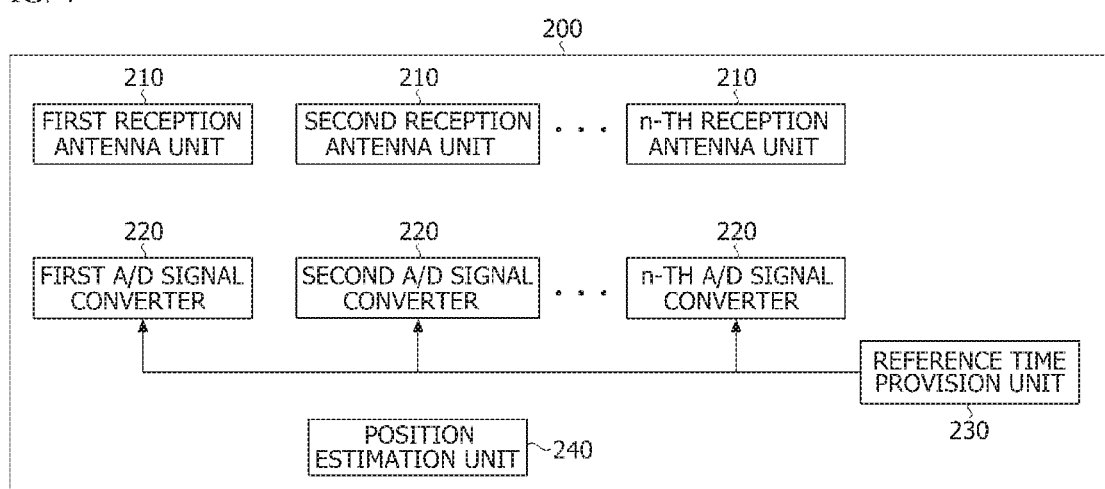
FIG. 4 is a block diagram of a configuration of a central radio reception device according to an embodiment of the present invention.

FIG. 1 is a conceptual view of a radio source position estimation system according to an embodiment of the present invention, FIG. 2 is a view of a configuration of a radio source position estimation system according to an embodiment of the present invention, FIG. 3 is a block diagram of a configuration of a radio transmission device according to an embodiment of the present invention, and FIG. 4 is a block diagram of a configuration of a central radio reception device according to an embodiment of the present invention.

Referring to FIGS. 1 through 4, a radio source position estimation system according to an embodiment of the present invention may include a plurality of radio transmission devices 100, which are spaced a predetermined distance apart from one another, transmit radio frequency (RF) signals received from an arbitrary radio source with each individual position being known to a central radio reception device 200, and the central radio reception device 200, which estimates the position of the radio source using the RF signals received from at least three radio transmission devices 100.

Each of the plurality of radio transmission devices 100 may be mounted on a moving body. The radio transmission device 100 may be mounted on, for example, a vehicle, a manned/unmanned air vehicle, a vessel, a ship, or the like. The radio transmission device 100 may continuously receive the RF signals radiated from the arbitrary radio source while moving and may transmit the received RF signals to the adjacent central radio reception device 200.

The central radio reception device 200 receives the RF signals from three or more radio transmission devices 100 located within a predetermined range and estimates the position of the radio source. A separate communication line is not provided between the central radio reception device 200 and the radio transmission devices 100, and data communication is performed in a wireless communication manner.

The radio transmission device 100 may include a radio reception antenna unit 110, a signal amplification unit 120, and a radio transmission antenna unit 130.

The radio reception antenna unit 110 may receive the RF signals from the arbitrary radio source. The radio reception antenna unit 110 may receive the RF signals radiated from the arbitrary radio source continuously and may transmit the received RF signals to the signal amplification unit 120. The RF signals radiated from the arbitrary radio source may be spherical waves having no particular directionality, for example.

The signal amplification unit 120 may amplify the RF signals received from the radio reception antenna unit 110. In this case, the signal amplification unit 120 may determine a signal amplification gain according to a distance between the radio transmission device and the central radio reception device 200, and the plurality of radio transmission devices 100 may determine the degree of signal amplification differently.

The radio transmission antenna unit 130 may transmit the amplified RF signals to the central radio reception device 200.

At least one of the radio reception antenna unit 110 and the radio transmission antenna unit 130 may be a directional antenna.

When the radio reception antenna unit 110 is a directional antenna, a direction of the antenna is changed into a direction of the radio source estimated by the central radio reception device 200 so that more precise monitoring can be performed. When the radio transmission device 100 mounted on the moving body is moved, the direction of the antenna is frequently changed into the direction of the radio source so that continuous monitoring of the radio source can be performed.

In addition, when the radio transmission antenna unit 130 is a directional antenna, when the radio transmission device 100 mounted on the moving body is moved, the direction of the antenna is aligned toward the central radio reception device 200 so that a reduction in the intensity of transmitted signals can be minimized.

Next, the central radio reception device 200 may include a reception antenna unit 210, a reference time provision unit 230, an analog-digital (A/D) signal converter 220, and a position estimation unit 240.

The reception antenna unit 210 is provided to correspond to the radio transmission device in a one-to-one manner and may receive the RF signals transmitted from the radio transmission device 100. The reception antenna unit 210 is provided to correspond to the number of radio transmission devices 100 for receiving the RF signals and receives the RF signals from each radio transmission device 100.

The A/D signal converter 220 performs independently digital sampling on the RF signals received by the reception antenna unit 210. In an embodiment of the present invention, the number of A/D signal converters 220 corresponds to the number of reception antenna units 210. However, one A/D signal converter may be provided. The A/D signal converter 220 performs digital sampling on the RF signals received independently from the reception antenna unit 210 regardless of the number of A/D signal converters 220.

The reference time provision unit 230 may provide a reference time. The A/D signal converters 220 may perform digital sampling by referring to the reference time provided by the reference time provision unit.

Because the RF signals received from the plurality of radio transmission devices 100 are not time synchronized, when the position of the radio source is estimated by the position estimation unit 240, the correct position of the radio source cannot be estimated. Thus, according to the present invention, the reference time provision unit 230 capable of providing a reference time to the central radio reception device 200 may be provided so that time synchronization of the RF signals transmitted from the plurality of radio transmission devices 100 can be performed.

The A/D signal converter 220 performs digitalization on the RF signals using the reference time. A time error generated during A/D conversion may be commonly applied to all of the A/D signal converters 220 and may be eliminated by applying a time difference of arrival (TDOA).

The position estimation unit 240 may estimate the position of the radio source by applying the TDOA to the digitally-sampled RF signals.

The position estimation unit 240 may estimate the position of the radio source by applying an arrival delay time difference of the time-synchronized RF signals received from the plurality of radio transmission devices 100. First, the position estimation unit 240 may select one among the plurality of radio transmission devices 100 as a reference radio transmission device and may perform cross correlation between RF signals received from the reference radio transmission device and RF signals received from other radio transmission devices, thereby calculating a time when a cross correlation value is a maximum value to be a TDOA measurement value.

The TDOA measurement value may be expressed using position coordinates of the reference radio transmission device and other radio transmission devices, as shown in the following equation, Equation 1.

$$\tau_{ri} = (t_r - t_s) - (t_i - t_s) = \frac{\sqrt{(x-x_r)^2 + (y-y_r)^2} - \sqrt{(x-x_i)^2 + (y-y_i)^2}}{c} = \quad \text{Equation 1}$$

$$f_{r,i}(x, y, x_r, y_r, x_i, y_i)$$

In Equation 1, $\tau_{ri}$ is a TDOA measurement value, $t_s$ is a time when a radio source transmits signals, $t_r$ is a time when the reference radio transmission device receives RF signals of the radio source, $t_i$ is a time when an $i^{th}$ radio transmission device receives the RF signals of the radio source, $(x, y)$ is a position coordinate of the radio source, $(x_r, y_r)$ is a position coordinate of the reference radio transmission device, $(x_i, y_i)$ is a position coordinate of the $i^{th}$ radio transmission device, and c is velocity of light.

The position estimation unit 240 linearizes Equation 1 of the TDOA measurement value based on the following equation, Equation 2.

$$\tau_{ri} = f_{r,i}(\bullet) \cong f_{r,i}(\bullet)_{(x_0,y_0)} + \frac{\partial f_{r,i}(\bullet)_{(x_0,y_0)}}{\partial x_0}\delta x + \frac{\partial f_{r,i}(\bullet)_{(x_0,y_0)}}{\partial y_0}\delta y \quad \text{Equation 2}$$

$$= \frac{1}{c}\sqrt{(x_0-x_r)^2 + (y_0-y_r)^2} - \sqrt{(x_0-x_i)^2 + (y_0-y_i)^2} +$$

$$\frac{1}{c}\frac{x_0-x_i}{\sqrt{(x_0-x_i)^2 + (y_0-y_i)^2}} - \frac{x_0-x_1}{\sqrt{(x_0-x_1)^2 + (y_0-y_i)^2}} +$$

$$\frac{1}{c}\frac{y_0-y_i}{\sqrt{(x_0-x_i)^2 + (y_0-y_i)^2}} - \frac{y_0-y_1}{\sqrt{(x_0-x_1)^2 + (y_0-y_i)^2}}$$

In Equation 2, $(x_0, y_0)$ is an initial position coordinate of the radio source.

In a state in which a first radio transmission device among N radio transmission devices is set as a reference radio transmission device and the other second to $N^{th}$ sensors are set as an $i^{th}$ radio transmission device, the position estimation unit 240 substitutes the $i^{th}$ radio transmission device for an objective function of the following equation, Equation 3 so that a matrix equation based on the following equation, Equation 4 can be expressed.

$$\text{ratio}(r) = \sum_{i=1,i\neq r}^{N} \frac{R_{ri}(m_{ri})}{R_{ri}(m_{ri}-1) + R(M_{ri}+1)} \quad \text{Equation 3}$$

$$\frac{1}{c}\begin{bmatrix} G_{x21} & G_{y21} \\ G_{x31} & G_{y31} \\ \vdots & \vdots \\ G_{xN1} & G_{yN1} \end{bmatrix}\begin{bmatrix} \delta x \\ \delta y \end{bmatrix} = \begin{bmatrix} \tau_{12} - \tau_{12}|_{(x_0,y_0)} \\ \tau_{13} - \tau_{13}|_{(x_0,y_0)} \\ \vdots \\ \tau_{1N} - \tau_{1N}|_{(x_0,y_0)} \end{bmatrix} \quad \text{Equation 4}$$

$$G\delta = Z$$

In Equation 3, $R_{ri}(.)$ is a cross correlation value between RF signals received from the reference radio transmission device and the $i^{th}$ radio transmission device, and $m_{ri}$ is a delay time when $R_{ri}(.)$ is at maximum, and N is the number of radio transmission devices.

In Equation 4, $G_{xil}$ is $$\frac{x_0-x_i}{\sqrt{(x_0-x_i)^2 + (y_0-y_i)^2}} - \frac{x_0-x_1}{\sqrt{(x_0-x_1)^2 + (y_0-y_i)^2}},$$

$G_{yil}$ is $$\frac{y_0-y_i}{\sqrt{(x_0-x_i)^2 + (y_0-y_i)^2}} - \frac{y_0-y_1}{\sqrt{(x_0-x_1)^2 + (y_0-y_i)^2}},$$

$\tau_{ri}|(x_0, y_0)$ is $$\frac{1}{c}\sqrt{(x_0-x_r)^2 + (y_0-y_r)^2} - \sqrt{(x_0-x_i)^2 + (y_0-y_i)^2},$$

$\delta$ is a position variation quantity, and Z is a difference value between a measurement value and an estimation value.

The position estimation unit 240 may calculate the position variation quantity 6 according to the following equation, Equation 5.

$$\hat{\delta} = [G^T Q^{-1} G]^{-1} G^T Q^{-1} Z \quad \text{Equation 5}$$

In Equation 5, Q is a covariance matrix of a measurement error.

The position estimation unit 240 may estimate a position coordinate of the radio source according to the following equation, Equation 6.

$$\begin{bmatrix} \hat{x} \\ \hat{y} \end{bmatrix} = \begin{bmatrix} x_0 \\ y_0 \end{bmatrix} + \begin{bmatrix} \hat{\delta x} \\ \hat{\delta y} \end{bmatrix} \quad \text{Equation 6}$$

In Equation 6, $$\left( \hat{x}, \hat{y} \right)$$

is an estimated position coordinate of the radio source, and $(x_0, y_0)$ is an initial position coordinate of the radio source.

In Equation 6, the estimated position coordinate of the radio source depends on an initial position coordinate. Thus, a finally-estimated position of the radio source may be calculated by substituting the estimated position coordinate calculated by Equation 6 for the initial position coordinate again and then by repeatedly performing procedures from Equation 2 to Equation 6. These procedures are repeated until a stop condition is satisfied. This stop condition may be based on the case where a variance quantity of δ is less than or equal to a predetermined threshold value TH.

The terms, such as '~unit', used in the present embodiment refer to software, or a hardware component, such as a field-programmable gate array (FPGA) or an application specific integrated circuit (ASIC), and the terms '~unit' play certain roles. However, the terms '~unit' are not limited to software or hardware. The terms '~unit' may be configured to be placed in an addressing storage medium or to reproduce one or more processors. Thus, in an example, the terms '~unit' include components, such as software components, object-oriented software components, class components, task components, processes, functions, properties, procedures, subroutines, segments of a program code, drivers, firmware, micro-codes, circuits, data, a database, data structures, tables, arrays, and variables. Functions provided by these components and the terms '~unit' may be combined with a smaller number of components and '~units' or may be subdivided into additional components and '~units'. Furthermore, the components and '~units' may also be implemented to reproduce one or more central processing units (CPUs) within a device or a security multimedia card.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A radio source position estimation system comprising:
at least three radio transmission devices spaced a predetermined distance apart from one another and configured to transmit radio frequency (RF) signals received from an arbitrary radio source; and
a central radio reception device configured to estimate a position of the radio source using RF signals received from the at least three radio transmission devices;
wherein the central radio reception device comprises:
at least three reception antenna units provided to correspond to the radio transmission device in a one-to-one manner and configured to receive RF signals transmitted from the radio transmission device;
a reference time provision unit configured to provide a time reference;
at least three analog-to-digital (A/D) signal converters configured to perform digital sampling on the RF signals received independently by the at least three reception antenna units; and
a position estimation unit configured to estimate a position of the radio source by:
selecting one among the at least three radio transmission devices as a reference radio transmission device,
performing cross correlation between RF signals received from the reference radio transmission device and RF signals received from other radio transmission devices,
calculating a Time Difference Of Arrival (TDOA) measurement value by identifying a time when a cross correlation value is a maximum value,
calculating a position variation quantity based on the TDOA measurement value, and
estimating the position of the radio source by applying the following equations, using the position variation quantity, and an initial position coordinate of the radio source:

$$\tau_{ri} = (t_r - t_s) - (t_i - t_s) = \quad \text{Equation 1}$$

$$\frac{\sqrt{(x-x_r)^2 + (y-y_r)^2} - \sqrt{(x-x_i)^2 + (y-y_i)^2}}{c} =$$

$$f_{r,i}(x, y, x_r, y_r, x_i, y_i)$$

(In Equation 1, $\tau_{ri}$ is a TDOA measurement value, $t_s$ is a time when a radio source transmits signals, $t_r$ is a time when the reference radio transmission device receives RF signals of the radio source, $t_i$ is a time when an $i^{th}$ radio transmission device receives the RF signals of the radio source, (x, y) is a position coordinate of the radio source, $(x_r, y_r)$ is a position coordinate of the reference radio transmission device, $(x_i, y_i)$ is a position coordinate of the $i^{th}$ radio transmission device, and c is velocity of light)

$$\tau_{ri} = f_{r,i}(\bullet) \cong f_{r,i}(\bullet)_{(x_0, y_0)} + \frac{\partial f_{r,i}(\bullet)_{(x_0, y_0)}}{\partial x_0} \delta x + \frac{\partial f_{r,i}(\bullet)_{(x_0, y_0)}}{\partial y_0} \delta y \quad \text{Equation 2}$$

$$= \frac{1}{c} \sqrt{(x_0 - x_r)^2 + (y_0 - y_r)^2} - \sqrt{(x_0 - x_i)^2 + (y_0 - y_i)^2} +$$

$$\frac{1}{c} \frac{x_0 - x_i}{\sqrt{(x_0 - x_i)^2 + (y_0 - y_i)^2}} - \frac{x_0 - x_1}{\sqrt{(x_0 - x_1)^2 + (y_0 - y_i)^2}} +$$

-continued $$\frac{1}{c}\frac{y_0 - y_i}{\sqrt{(x_0 - x_i)^2 + (y_0 - y_i)^2}} - \frac{y_0 - y_1}{\sqrt{(x_0 - x_1)^2 + (y_0 - y_i)^2}}$$

(In Equation 2, $(x_0, y_0)$ is an initial position coordinate of the radio source)

$$\text{ratio}(r) = \sum_{i=1, i \neq r}^{N} \frac{R_{ri}(m_{ri})}{R_{ri}(m_{ri} - 1) + R(M_{ri} + 1)} \quad \text{Equation 3}$$

$$\frac{1}{c}\begin{bmatrix} G_{x21} & G_{y21} \\ G_{x31} & G_{y31} \\ \vdots & \vdots \\ G_{xN1} & G_{yN1} \end{bmatrix}\begin{bmatrix} \delta x \\ \delta y \end{bmatrix} = \begin{bmatrix} \tau_{12} - \tau_{12}\,|_{(x_0, y_0)} \\ \tau_{13} - \tau_{13}\,|_{(x_0, y_0)} \\ \vdots \\ \tau_{1N} - \tau_{1N}\,|_{(x_0, y_0)} \end{bmatrix} \quad \text{Equation 4}$$

$$G\delta = Z$$

(In Equation 3, $R_{ri}(.)$ is a cross correlation value between RF signals received from the reference radio transmission device and the $i^{th}$ radio transmission device, and $m_{ri}$ is a delay time when $R_{ri}(.)$ is at maximum, and N is the number of radio transmission devices)

(In Equation 4, $G_{xil}$ is $$\frac{x_0 - x_i}{\sqrt{(x_0 - x_i)^2 + (y_0 - y_i)^2}} - \frac{x_0 - x_1}{\sqrt{(x_0 - x_1)^2 + (y_0 - y_i)^2}},$$

$G_{yil}$ is $$\frac{y_0 - y_i}{\sqrt{(x_0 - x_i)^2 + (y_0 - y_i)^2}} - \frac{y_0 - y_1}{\sqrt{(x_0 - x_1)^2 + (y_0 - y_i)^2}},$$

$\tau_{ri}|(x_0, y_0)$ is $$\frac{1}{c}\sqrt{(x_0 - x_r)^2 + (y_0 - y_r)^2} - \sqrt{(x_0 - x_i)^2 + (y_0 - y_i)^2},$$

$\delta$ is a position variation quantity, and Z is a difference value between a measurement value and an estimation value)

$$\hat{\delta} = [G^T Q^{-1} G]^{-1} G^T Q^{-1} Z \quad \text{Equation 5}$$

(In Equation 5, Q is a covariance matrix of a measurement error)

$$\begin{bmatrix} \hat{x} \\ \hat{y} \end{bmatrix} = \begin{bmatrix} x_0 \\ y_0 \end{bmatrix} + \begin{bmatrix} \hat{\delta x} \\ \hat{\delta y} \end{bmatrix} \quad \text{Equation 6}$$

(In Equation 6, $$\left( \hat{x}, \hat{y} \right)$$

is an estimated position coordinate of the radio source, and $(x_0, y_0)$ is an initial position coordinate of the radio source).

2. The radio source position estimation system of claim 1, wherein each of the A/D signal converters performs digital sampling by referring to a reference time provided by the reference time provision unit.

3. The radio source position estimation system of claim 1, wherein each of the at least three radio transmission devices comprises:
   a radio reception antenna unit configured to receive RF signals from the arbitrary radio source;
   a signal amplification unit configured to amplify the RF signals; and
   a radio transmission antenna unit configured to transmit the amplified RF signals to the central radio reception device.

4. The radio source position estimation system of claim 3, wherein at least one of the radio reception antenna unit and the radio transmission antenna unit is a directional antenna.

5. The radio source position estimation system of claim 3, wherein the radio transmission antenna unit transmits a time stamp, which is issued with respect to a reception time when the RF signals are received from the radio reception antenna unit and a transmission time when the RF signals are output to the radio transmission antenna unit, together with the RF signals.

6. The radio source position estimation system of claim 4, wherein a direction of said radio reception directional antenna is changed into a direction of the radio source estimated by the central radio reception device.

7. The radio source position estimation system of claim 3, wherein each signal amplification unit of a respective one of the at least three radio transmission devices, is configured to determine a signal amplification gain according to a distance between the respective radio transmission device and the central radio reception device.

8. The radio source position estimation system of claim 4, wherein each of the at least three radio transmission devices is mounted on a moving body and wherein a direction of said radio transmission directional antenna is aligned toward the central radio reception device.

9. The radio source position estimation system of claim 1, wherein each of the at least three radio transmission devices is mounted on a moving body.

* * * * *